INVENTOR
CHARLES R. VESTAL

United States Patent Office 3,755,401
Patented Aug. 28, 1973

3,755,401
PROCESS FOR PREPARING POLYISOCYANATES WHICH INVOLVES SELECTIVE PRECIPITATION OF INORGANIC SALTS
Charles R. Vestal, Denver, Colo., assignor to Marathon Oil Company, Findlay, Ohio
Filed Sept. 24, 1970, Ser. No. 75,014
Int. Cl. C07c 119/04
U.S. Cl. 260—453 P          9 Claims

ABSTRACT OF THE DISCLOSURE

Formation of undesired isocyanurates is avoided in preparation of diisocyanates by reaction of organic halide with metal cyanate in the presence of metal halide in aprotic solvent by the improvement of adding a selective solvent to precipitate the inorganic salts before the product mixture is heated sufficiently to initiate trimerization as the aprotic solvent is evaporated off.

CROSS REFERENCES TO RELATED APPLICATIONS

The present application relates to purification techniques valuable in connection with the preparation of diisocyanates, particularly by reacting organic halides with metal cyanates in the presence of metal halides as taught by copending U.S. patent applications Ser. No. 830,541, filed 1969, and now U.S. Pat. No. 3,363,100; Ser. No. 840,-843, filed 1969 and now abandoned, U.S. Pat. 3,458,448.

BACKGROUND OF THE INVENTION

Field of the invention

The present invention relates to methods for the preparation of organic isocyanates, generally classified in U.S. Patent Office Class 260 "Chemistry, Carbon Compounds"; subclass 453 "Carbocyclic or Acyclic Esters and Processes of Making Same."

Description of the prior art

A variety of prior art patents have taught the preparation of various di- and triisocyanates from organic dichlorides and alakli metal cyanates, e.g., U.S. 3,017,-420 to Schaeffer, U.S. 2,866,801 to Himel et al; U.S. 2,866,802 to Graham; U.S. 2,866,803 to De Pree, and U.S. 3,440,270 to McMaster et al. The latter patent teaches the quenching of the cyanate addition reaction with a solvent which is intended to remove the metal halide by crystallizing the dimethyl sulfone used as the aprotic solvent media, e.g. a chlorinated hydrocarbon quenching solvent. However, the present invention provides new methods for the control of the formation of isocyanurate rings in the finished product. While a limited percentage of such isocyanurate rings can be useful in the finished product, an excessive content of isocyanurate rings provides a highly cross-linked insoluble mass which is incapable of entering into the valuable reactions for which di- and polyisocyanates are commonly utilized, e.g. the production of urethane plastics.

SUMMARY

General statement of the invention

In the reaction of metal cyanate, e.g. sodium cyanate with organic dihalides, e.g. xylylene dichloride in the presence of metal halide, e.g. sodium bromide, and aprotic solvent, e.g. dimethylformamide, there is formed a product mixture which is generally heated to distill off the aprotic solvent. Heating of the product mixture in the presence of unreacted cyanate metal causes trimerization to occur, forming isocyanurate rings, frequently in objectionable concentrations. The present invention permits the removal of this metal cyanate along with metal halides. This removal is accomplished prior to heating of the mixture sufficiently to initiate trimerization in the process to distill off the aprotic solvent. Thus, excessive trimerization is avoided and highly reactive product containing a high percentage of its nitrogen in the form of free isocyanates (rather than combined into isocyanurate rings) is obtained.

Utility of the invention

The invention permits the production of di- and polyisocyanates substantially free from inorganic salts. The product mixture resulting from the invention, with or without removal of the aprotic solvent, can be utilized for various reactions including the formation of urethanes by reaction with active hydrogen-containing polyols, polyethers, polyamines, etc. Such reactions may be conducted as taught in Saunders and Frisch,, High Polymers, vol. 16, Polyurethanes, Part I, Chem. (Interscience).

DESCRIPTION OF THE PREFERRED EMBODIMENTS

Starting materials

Figure 1:
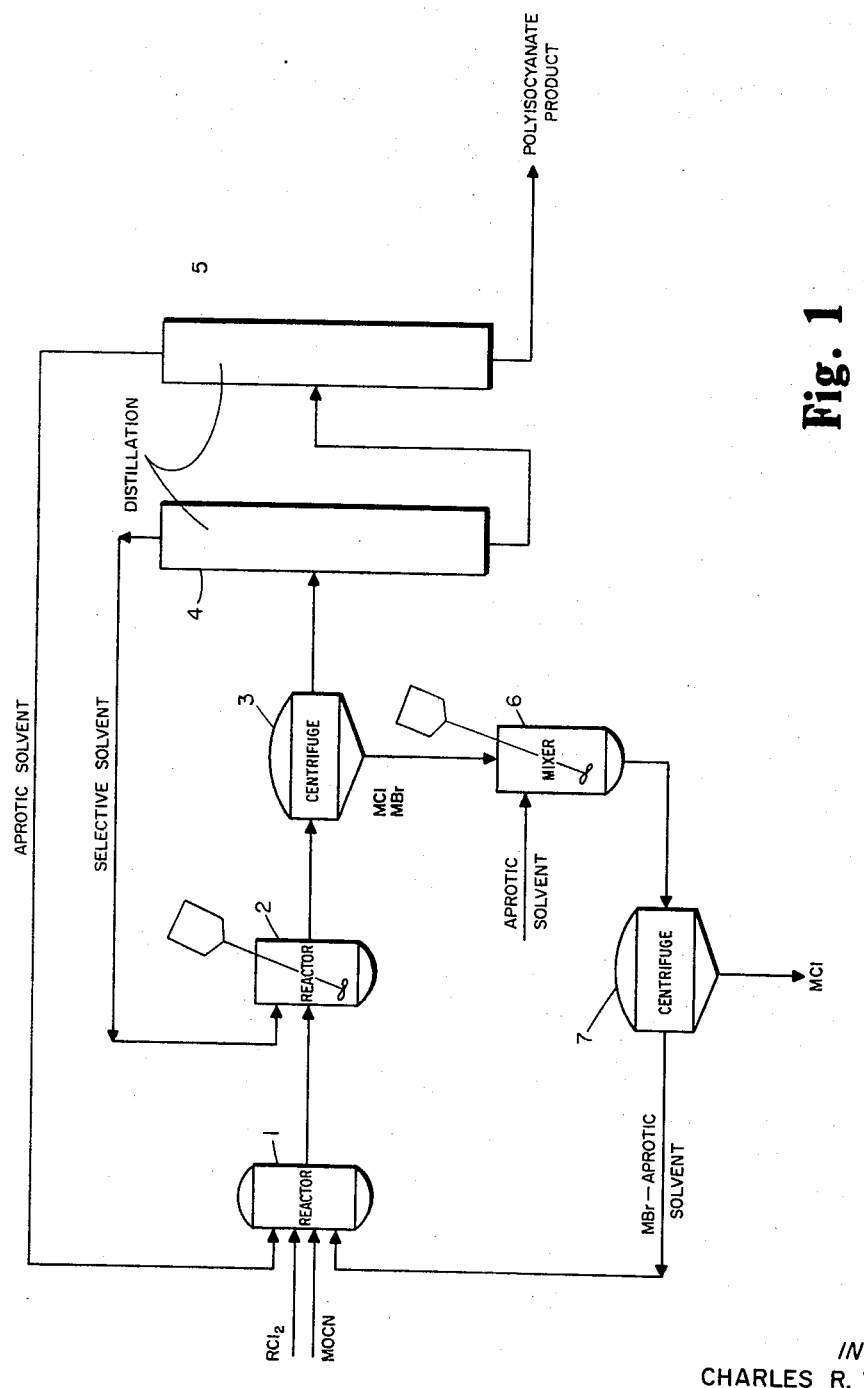
FIG. 1 is a schematic representation of a preferred embodiment of the present invention.

The starting materials and reaction to which the improvements of the present invention are preferably applied may be summarized as follows:

In general, the invention involves the production of polyisocyanates through the reaction of an organic dichloride with a metal cyanate in the presence of a metal halide, preferably an iodide or bromide using an aprotic solvent as defined herein. The overall reaction may be generally summarized as follows:

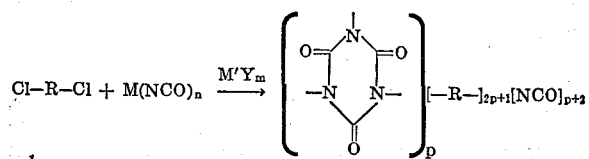

where
R=divalent alkyl or substituted divalent alkyl, for example:

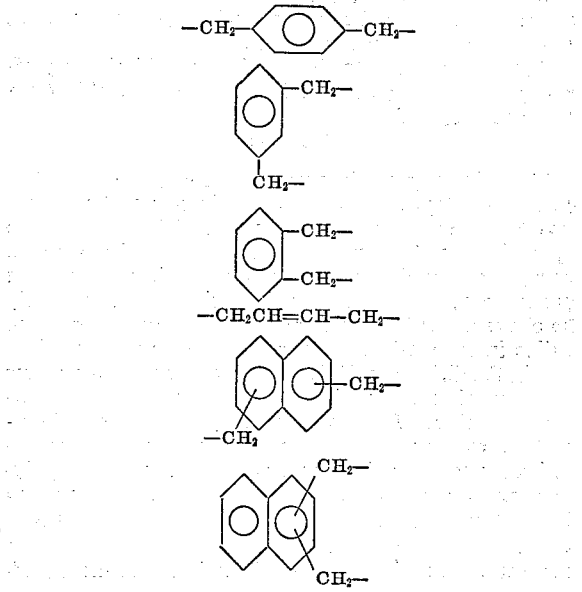

```
—CH₂—CH₂—CH₂—CH₂—
—CH₂CH₂CH₂CH₂—CH₂—
—(CH₂)ₙ—
```
where n=3-20

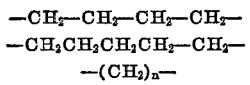

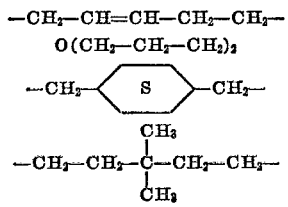

etc.

and the alkyl, preferably lower alkyl, derivatives of the foregoing.

M=alkali or alkaline earth metal, for example Li, Na, K, Rb, Cs, Be, Mg, Ca, etc., n=oxidation number of metal, M'=a metal, preferably an alkali or alkaline earth metal, Y=a very reactive nucleophile, for example I or Br, m=oxidation state of the metal M', p may be varied from 0 to over 15, but will preferably be from 1 to about 6 in order to produce the desirable isocyanurate-containing polyisocyanates of the present invention. The value of p may be controlled by utilizing greater or lesser concentrations of the halide catalyst as discussed hereafter.

Reaction media

By aprotic solvents is meant compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones, dialkyl formamides (e.g., N,N-dimethylformamide (DMF), N,N-dimethylacetamide, acetonitrile, N-alkylpyrrolidones, hexaalkylphosphoramides, and tetraalkylureas, especially those in which the alkyl groups are methyl groups. The most preferred solvent for the reaction of the present invention is dimethyl formamide. Preferably from about 5 to about 100 and most preferably from about 10 to about 50 moles of the solvent will be present for each mole of dihalide starting material.

The ratio of NCO to chlorine in the dichloride is preferably from 0.8 to about 1.5 and most preferably from 1.00 to about 1.10.

Catalyst

The value of p can be varied by varying the amount of catalyst employed in the reaction mixtures of the present invention. For example, at reflux in DMF, p will average approximately 1 when the concentration of the halide catalyst is about 0.10 to 0.15 mole of halide in the catalyst per mole of chlorine in the dichloride, p will generally be above about 2 when from about 0.01 to 0.05 mole of halide in the catalyst are present for each mole of chlorine in the dichloride. Different solvents and temperatures will somewhat change the average values of p, and intermediate values of catalyst concentration will give intermediate average values of p. For most polyisocyanates which are to be used in the production of urethane polymers an average value of p of approximately 0.5 to about 2.5 will be preferred, with values of from about 1.0 to about 2.0 being most preferred. Correspondingly, catalysts concentration of from 0.02 to about 0.25, and more preferably 0.05 to about 0.15 mole of halide in the catalyst per mole of chlorine in the dichloride will be used in producing isocyanates for urethane production.

Temperature and pressure

The reaction of the present invention is preferably conducted at a temperature of from about 25 to about 300° C. and most preferably at from 50 to about 150° C. Pressure is not critical and may be from below one atmosphere to over 10,000 p.s.i.a. In most cases, it will be preferable to conduct the reaction in the absence of air.

Reaction time

The reaction to which the present invention constitutes an improvement will preferably be run at reaction times of from 0.001 to about 100, more preferably from 0.02 to about 25, and most preferably from 0.05 to about 2 hours. Longer reaction times at given temperatures will increase the degree of trimerization, i.e. the percentage of NCO groups which are present in the final product in the form of isocyanurate rings.

Separations

In general, any hydrocarbon having a Kauri-Butanol (K-B) number in the range of about 80 to 160, more preferably 90 to 150, and most preferably 100 to 140, will be suitable if it is miscible and unreactive with the materials being separated. The table gives K-B numbers for some common solvents.

TABLE 1

Kauri-Butanol Numbers of various solvents (Reynolds, W. W., Physical Chemistry of Petroleum Solvents: Reinhold Publishing Corporation, New York, 1963, pages 36, 74 and 77).

| Solvent: | KB value |
|---|---|
| Hexadecane | 22.0 |
| n-Decane | 24.6 |
| 2,2,4-trimethylpentane | 25.9 |
| i-Octane | 26.0 |
| Odorless mineral spirits | 26.1 |
| n-Heptane | 27.0 |
| n-Hexane | 28.0 |
| 2,3-dimethylbutane | 29.0 |
| n-Pentane | 29.2 |
| 360 solvent | 32.0 |
| Toluene, 20% w.; hexane, 80% w. | 35.6 |
| Super VM and P naphtha | 37.7 |
| Mineral spirits | 38.8 |
| Toluene, 30% w.; hexane, 70% w. | 41.1 |
| Toluene, 40% w.; hexane, 60% w. | 48.8 |
| Methylcyclohexane | 50.9 |
| Cyclohexane | 57.9 |
| Cumene | 85.6 |
| Xylene | 103 |
| Toluene | 106 |
| Benzene | 107 |
| "Tetralin" | 132 |

Preferred selective solvents for the present invention include xylene, more preferably toluene, and most preferably benzene. From 0.1 to 50, more preferably from 0.5 to 20, and most preferably from 1 to 10 moles of selective solvent will be employed per mole of aprotic solvent present in the product mixture. This mole ratio will vary somewhat according to the particular products being produced and the particular inorganic salts to be removed. However, the ratio can readily be optimized by routine trial runs. Additionally, the selective solvent must be miscible and unreactive in the product mixture.

As mentioned previously, the aprotic solvent and the selective solvent are preferably separated from the product mixture resulting from the isocyanate-forming reaction. In most cases, such separation will be accomplished by fractional distillation, but other separatory techniques including selective adsorption, specialized extractions, vacuum distillation, or other suitable conventional techniques.

Similarly, the inorganic salts will usually be removed most conveniently by filtering or centrifugation but suitable conventional techniques such as fractional crystallization, settling, and decantation, etc. may be substituted. In some instances, the streams may be separated as a mixture rather than a pure component, e.g. both the aprotic solvent and the selective solvent may be recovered as a single stream. Also, in some instances the sodium bromide or other halide catalyst may be recycled in whole or in part as a solid dissolved within the aprotic solvent.

Where the aprotic solvent is to be distilled off from the product mixture, the inorganic salts will be substantially removed prior to such heating. Preferably, such heating will not exceed about 180° C., more preferably 100° C., and most preferably 60° C. in order to prevent an undesirable degree of trimerization or possible degradation of the products or materials to be recycled. Such temperature will preferably be below the boiling point of the aprotic solvent employed at the pressure employed.

It is preferred that the entire reaction sequence be conducted under substantially anhydrous conditions. Preferably less than about 1.0, more preferably less than 0.50, and most preferably less than about 0.01 percent by weight of water will be present in the reaction system.

Batch or continuous basis

While the examples describe the invention on a continuous basis, it may of course, be practiced on a batch basis with starting materials being added to a batch-type reactor and with the selective solvent being added to the product mixture in the same reactor for after transfer to a second reactor.

Examples

The invention will be better understood by reference to the following examples which are to be considered as illustrating the specific embodiments of the invention and as not limiting the invention in any way.

EXAMPLE I

Referring to FIG. 1, to a tubular reactor 1 operating at a temperature of approximately 285° F., and at a pressure of approximately 12.2 p.s.i.a. is added 29 lb./hr. of anhydrous dimethyl formamide (DMF) aprotic solvent, 3.05 lb./hr. of bis(chloromethyl)toluene, 2.2 lb./hr. of sodium cyanate, and 0.50 lb./hr. of sodium bromide. The effective reaction time is approximately 0.1 hour and the product mixture, consisting of approximately 0.05 lb./hr. of unreacted bis(chloromethyl)toluene, 1.8 lb./hr. of sodium chloride, 3.2 lb./hr. of polyisocyanates, 0.2 lb./hr. of unreacted sodium cyanate, 0.5 lb./hr. of sodium bromide, and 29 lb./hr. of dimethylformamide, is continuously withdrawn into reactor 2 where 150 lb./hr. of benzene, selective solvent, is added. The benzene is thoroughly mixed with the product mixture, and the resulting admixture is continuously transferred to a centrifuge 3 which seperates out a solid phase consisting of 0.5 lb./hr. of sodium bromide, 0.2 lb./hr. of sodium cyanate, and 1.8 lb./hr. of sodium chloride. The liquid phase from the centrifuge, having a temperature approximately 75° F., enters flash drum 4 operating at a pressure of 1.75 p.s.i.a., where substantially all of the benzene is flashed off as overheads for recycle to reactor 2. The effluent from flash drum 4 is continuously withdrawn to a second flash drum 5 operating at a temperature of approximately 140° F., and at a pressure of approximately 0.1 p.s.i.a. Dimethylformamide aprotic solvent is removed as overheads from flash drum 5 and is recycled to reactor 1. Recovery of aprotic solvent and selective solvent is substantially complete and only about 0.1 lb./hr. of each need be added as makeup. The resulting substantially dry product from flash drum 5 is shown to have 5.06 meqs. NCO/g. by infrared analysis. The solid phase from the centrifuge consisting of unreacted sodium cyanate, sodium bromide, and sodium chloride is transferred to a mixing vessel 6. In this mixing vessel, a small stream of dimethylformamide aprotic solvent is added and the sodium bromide catalyst and a small portion of unreacted sodium cyanate is dissolved. The effluent from the mixing vessel 6 is transferred to a continuous centrifuge 7 where the liquid phase consisting of the aforementioned dissolved sodium bromide in the aprotic solvent is recovered from the solid consisting of sodium chloride and a certain portion of the unrecated sodium cyanate. The liquid stream from centrifuge 7 is returned to reactor 1 and used again.

EXAMPLE II

When the apparatus and starting materials of Example I are manipulated as described in Example I except that the flow of selective solvent benzene is discontinued, the compositions of the various streams remain approximately the same except that the content of benzene is zero, and the final product is shown to have 4.73 meqs. NCO/g. by infrared analysis. This mixture had to be heated to approximately 175° F., at approximately 0.1 p.s.i.a. to remove the solvent because of the higher viscosity of the product.

EXAMPLE III

When the apparatus and starting materials of Example I are manipulated as described in Example I except substituting an equimolar quantity of cyclohexane for the benzene employed in Example I, negative results are obtained. The cyclohexane and the reactor effluent from reactor 1 are not miscible, the this solvent will not perform the selective precipitation of the inorganic salts.

EXAMPLE IV

When the apparatus and starting materials of Example I are manipulated as described in Example I except substituting an equimolar quantity of iso-octane for the benzene employed in Example I, negative results are obtained. The iso-octane in the reactor effluent from reactor 1 are immiscible, and the selective solvent does not precipitate the inorganic salts.

EXAMPLE V

When the apparatus and starting materials of Example I are manipulated as described in Example I except substituting an equimolar quantity of tetralin for the benzene employed in Example I, the compositions of the various streams remain approximately the same except that tetralin is substituted for benzene and the final product is shown to have 5.00 meq. NCO/g. by infrared analysis.

EXAMPLE VI

Figure 2:
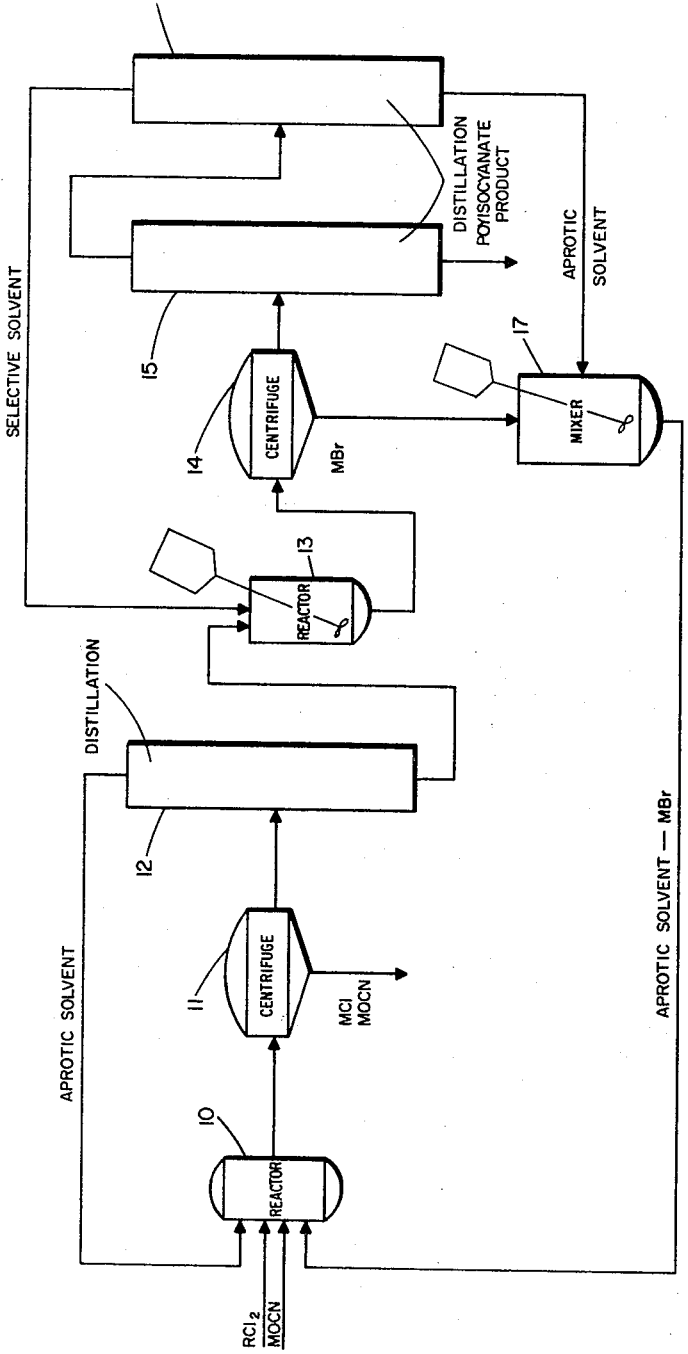
FIG. 2 is a schematic representation of a second preferred embodiment of the present invention.

Referring to FIG. 2, 1.66 lb./hr. of potassium iodide, 8.75 lb./hr. of p-xylylene dichloride, 6.85 lb./hr. of potassium cyanate, and 51 lb./hr. of n-methylpyrrolidone (NMP) are fed to a continuous flow stirred tank reactor 10 operating at a temperature of approximately 220° F., and a pressure of approximately 12.2 p.s.i.a. with an effective reaction time of approximately 1.5 hr. The resulting product mixture is continuously removed to centrifuge 11 where a solid phase, consisting of 5.85 lb./hr. of potassium chloride and 0.30 lb./hr. of potassium cyanate are removed. Because of the relatively small economic value of this minor stream, it is sent to waste although it could, of course, be recovered for use in other processes. The liquid phase from centrifuge 11 is continuously removed to flash drum 12 which operates at a temperature of approximately 220° F., and a pressure of approximately 0.05 p.s.i.a. and removes approximately 75% of the n-methylpyrrolidone as overhead for recycle to reactor 10. In a reactor 13, 260 lb./hr. of benzene selective solvent are added to the remaining product mixture and mixed in thoroughly. A filter 14 removes 1.66 lb./hr. of potassium iodide and a remaining 0.05 lb./hr. of potassium cyanate from the resulting co-mixture, and this stream is mixed with aprotic solvent recovered later in the process, and the combined stream recycled to reactor 10. The remaining liquid phase of the product mixture is separated in a fractionating column 15 which recovers a polyisocyanate product as bottoms and a mixture of both the selective and the aprotic solvent as overheads. A second fractionating column 16 separates the selective solvent from the aprotic solvent. The selective solvent is recycled to reactor 13, and the aprotic solvent, n-methyl pyrrolidone is mixed with the solid phase from filter 14 and recycled to reactor 10 as previously mentioned. The resulting polyisocyanate product is shown to have 4.7 meq. NCO/g. by infrared analysis.

EXAMPLE VII

When the techniques, conditions, and apparatus of Example II are followed except substituting an equimolar quantity of xylene for the selective solvent employed in Example VI, similar results are obtained.

EXAMPLE VIII

When the techniques, conditions, and apparatus of Example VI are followed except substituting an equimolar quantity of toluene for the benzene employed in Example VI, similar results are obtained.

Modifications of the invention

It should be understood that the invention is capable of a variety of modifications and variations which will be made apparent to those skilled in the art by a reading of the specification and which are to be included within the spirit of the claims appended hereto. For example, thin film vacuum distillation techniques can be utilized in place of fractionating columns in order to further minimize degradation of the product. The selective solvent can be added in two or more smaller aliquots where better efficiency of separation is thereby obtained.

What is claimed is:

1. In a process for the preparation of diisocyanates and triisocyanates by reaction of organic dichlorides with metal cyanate in the presence of catalysts selected from the group consisting of alkali metal or alkaline earth metal iodide or bromide or mixtures thereof in a reaction media consisting essentially of organic aprotic solvent, which is liquid under the conditions of the reaction, which has a dielectric constant greater than about 15 at 25° C., which is dipolar in that one part of the molecule has a more positive electrical charge relative to the other parts of the molecule, causing the molecule to act as a dipole, and which does not possess hydrogen atoms capable of hydrogen bonding with or transferring to anions in solution in the reaction mixture, wherein there are present from about 5 to about 100 moles of the aprotic solvent per mole of dichloride and wherein there are present from about 0.1 to about 0.15 mole of halide in the catalyst per mole of chlorine in the dichloride at a temperature of from about 25 to about 300° C. and at a pressure of from about one atmosphere to over 10,000 p.s.i.a., the improvement comprising the prevention of undesired quantities of isocyanurate ring by thereafter adding to the resulting product mixture from 1 to about 10 moles of selective hydrocarbon solvent per mole of said aprotic solvent, said selective hydrocarbon solvent having a Kauri-Butanol value of from about 80 to about 160, and said selective hydrocarbon solvent being miscible and unreactive, whereby said selective hydrocarbon solvent precipitates substantially all the inorganic salts from said product mixture.

2. The process of claim 1 wherein said selective solvent is selected from the group consisting of xylene, toluene, Tetralin, benzene and mixtures thereof.

3. The process of claim 1 wherein the selective solvent is added at a temperature of from about 20 to about 300° C., and the selective solvent has a Kauri-Butanol number of from about 90 to about 150.

4. The process of claim 1 wherein said selective solvent is separated from the product mixture remaining after precipitation and removal of said inorganic salts.

5. The process of claim 4 wherein said selective solvent is separated by distillation.

6. The process of claim 3 wherein the selective solvent comprises xylene.

7. The process of claim 3 wherein the selective solvent comprises toluene.

8. The process of claim 3 wherein the selective solvent comprises Tetralin.

9. The process of claim 3 wherein the selective solvent comprises benzene.

References Cited

UNITED STATES PATENTS

| 2,866,801 | 12/1958 | Himel et al. | 260—453 P |
| 2,866,802 | 12/1958 | Graham | 260—453 P |
| 3,584,028 | 6/1971 | Argabright et al. | 260—453 P |
| 3,211,631 | 10/1965 | Fuchs | 260—453 A |
| 3,479,384 | 11/1969 | Heiss | 260—453 A |

FOREIGN PATENTS

| 1,104,917 | 3/1968 | Great Britain | 260—453 A |

FLOYD D. HIGEL, Primary Examiner

U.S. Cl. X.R.

260—453 AP, 453 AR, 453 A, 453 AL